US008498784B2

(12) United States Patent
Savaresi et al.

(10) Patent No.: US 8,498,784 B2
(45) Date of Patent: Jul. 30, 2013

(54) METHOD FOR ESTIMATING THE SUSPENSION STROKE OF A VEHICLE AND APPARATUS IMPLEMENTING THE SAME

(75) Inventors: Sergio Matteo Savaresi, Cremona (IT); Cristiano Spelta, Monza (IT); Andrea Moneta, Milan (IT); Filippo Tosi, Milan (IT); Luca Fabbri, S. Maria di Sala (IT)

(73) Assignee: Piaggio & C. S.p.A., Pontedera (PI) (IT)

( * ) Notice: Subject to any disclaimer, the term of this patent is extended or adjusted under 35 U.S.C. 154(b) by 1008 days.

(21) Appl. No.: 12/217,616

(22) Filed: Jul. 7, 2008

(65) Prior Publication Data

US 2009/0024270 A1 Jan. 22, 2009

(30) Foreign Application Priority Data

Jul. 16, 2007 (IT) .............................. MI2007A1417

(51) Int. Cl.
  *G06F 17/00* (2006.01)
(52) U.S. Cl.
  USPC ................. 701/45; 701/37; 701/40; 188/267; 188/316; 188/156
(58) Field of Classification Search
  USPC .................. 701/29, 37, 40, 45; 188/267, 316, 188/156
  See application file for complete search history.

(56) References Cited

U.S. PATENT DOCUMENTS

| 5,324,067 | A | * | 6/1994 | Kallenbach et al. | ....... 280/5.519 |
| 5,367,459 | A | * | 11/1994 | Shtarkman et al. | ............. 701/37 |
| 5,586,032 | A | * | 12/1996 | Kallenbach et al. | ............. 701/45 |
| 6,244,398 | B1 | * | 6/2001 | Girvin et al. | ................... 188/316 |
| 7,269,485 | B2 | * | 9/2007 | Oikawa et al. | ..................... 701/1 |
| 7,318,408 | B2 | * | 1/2008 | Takamatsu et al. | ........... 123/396 |
| 7,344,142 | B2 | * | 3/2008 | Yasui | ......................... 280/5.511 |
| 7,370,739 | B2 | * | 5/2008 | Tsukamoto et al. | .......... 188/267 |
| 7,720,583 | B2 | * | 5/2010 | Takamatsu et al. | ............. 701/40 |
| 7,904,221 | B2 | * | 3/2011 | Oikawa et al. | .................. 701/37 |
| 2009/0024270 | A1 | * | 1/2009 | Savaresi et al. | ................. 701/29 |

FOREIGN PATENT DOCUMENTS

DE 41 12 004 A1 10/1992

OTHER PUBLICATIONS

EP Search Report dated Sep. 26, 2008.

* cited by examiner

*Primary Examiner* — Thomas Black
*Assistant Examiner* — Wae Louie
(74) *Attorney, Agent, or Firm* — Hedman & Costigan, P.C.; James V. Costigan; Kathleen A. Costigan

(57) ABSTRACT

The present invention refers to a method for estimating the suspension stroke of a vehicle comprising the steps consisting of: a) determining a variability law (10) that associates the stroke of the suspension with the pressure inside a shock absorber of the same, based on experimental data; b) estimating the suspension stroke value related to a measured pressure value, based on the variability law (10) identified in step (a); c) detecting/obtaining the longitudinal vehicle dynamics; d) recalibrating (30) the variability law (10) identified in step a), based on the longitudinal vehicle dynamics detected/obtained in step c). The present invention also refers to an apparatus for implementing the estimation method of the suspension stroke of a vehicle according to the invention.

8 Claims, 5 Drawing Sheets

METHOD FOR ESTIMATING THE SUSPENSION STROKE OF A VEHICLE AND APPARATUS IMPLEMENTING THE SAME

The present invention refers to a method for estimating the stroke of the suspension of a vehicle and an apparatus implementing the same.

The stroke is a necessary quantity for the electronic control of a suspension.

Typically, the stroke is measured with a linear potentiometer which, as sensor, has the defect of being fragile and costly, and thus is hard to apply on an industrial scale.

The stroke, moreover, is not even easily derivable from a measurement of the force produced by the suspension.

The force produced by a suspension as a function of the compression of the same can in fact be broken down into three fundamental contributions: a force of dissipative type due to the shock absorber and proportional to the suspension elongation speed; an elastic force due to the helical spring and proportional to the suspension elongation; and, in case of presence of a gas spring placed in parallel with the helical spring, an elastic force due to the same and non-linear function of the elongation.

Such contributions are not useful for possibly estimating the stroke of the suspension. The first only provides indications on the elongation speed: the position is then obtainable therefrom via integration plus or minus one offset.

The elastic contribution of the helical spring, being proportional to the position, could provide an immediate measurement thereof: but neither is this solution practical, since the measurement of the related force component is not easily done.

The object of the present invention is that of overcoming such drawback, finding stroke determination solutions that are stronger and less costly with respect to the use of a potentiometer.

Another object of the present invention is that of providing a method for estimating the suspension stroke that is highly accurate and thus ensures negligible estimation errors with respect to the total available stroke.

A further object of the present invention is that of achieving a method for estimating the suspension stroke capable of being dynamically adapted to the work conditions of the vehicle.

Not the least object of the present invention is that of making an estimation apparatus of the suspension stroke that is capable of implementing the aforesaid method.

These and other objects according to the present invention are attained by achieving a method for estimating the stroke as set forth in claim 1, as well as an apparatus according to claim 11.

Further characteristics of the method and apparatus are the object of the dependent claims.

The characteristics and advantages of an estimation method of the suspension stroke according to the present invention and related apparatus will be clearer from the following exemplifying and non-limiting description, referred to the attached schematic diagrams in which:

FIG. 1 graphically shows the experimental data regarding the time-variation of the stroke and pressure inside the shock absorber following stress;

Figure 4:
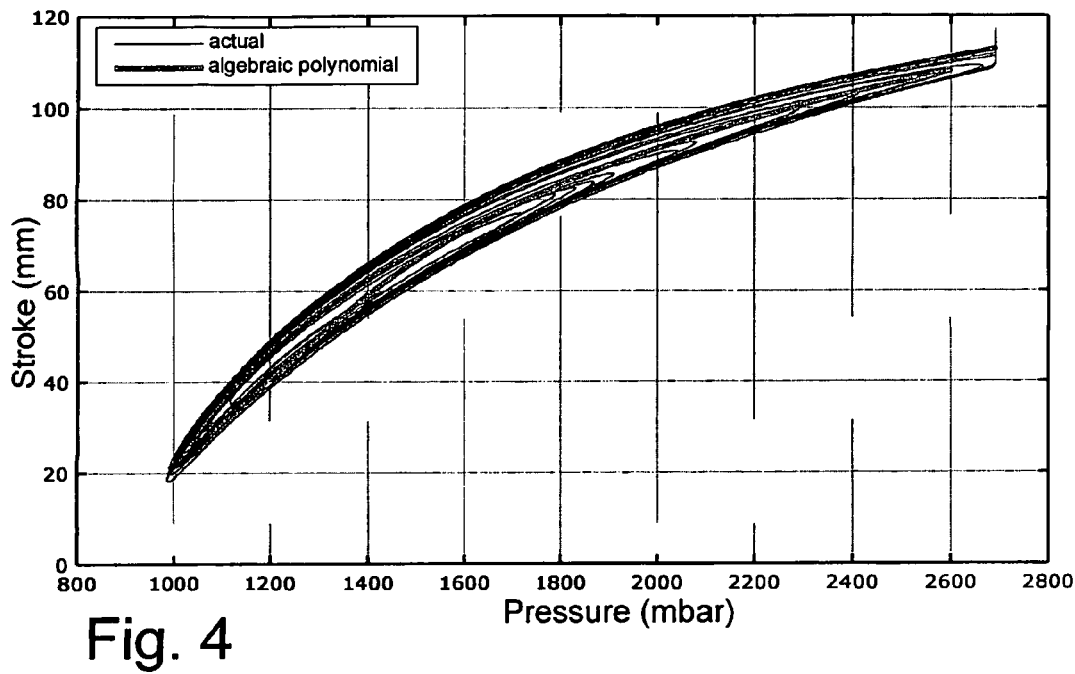
Figure 5:
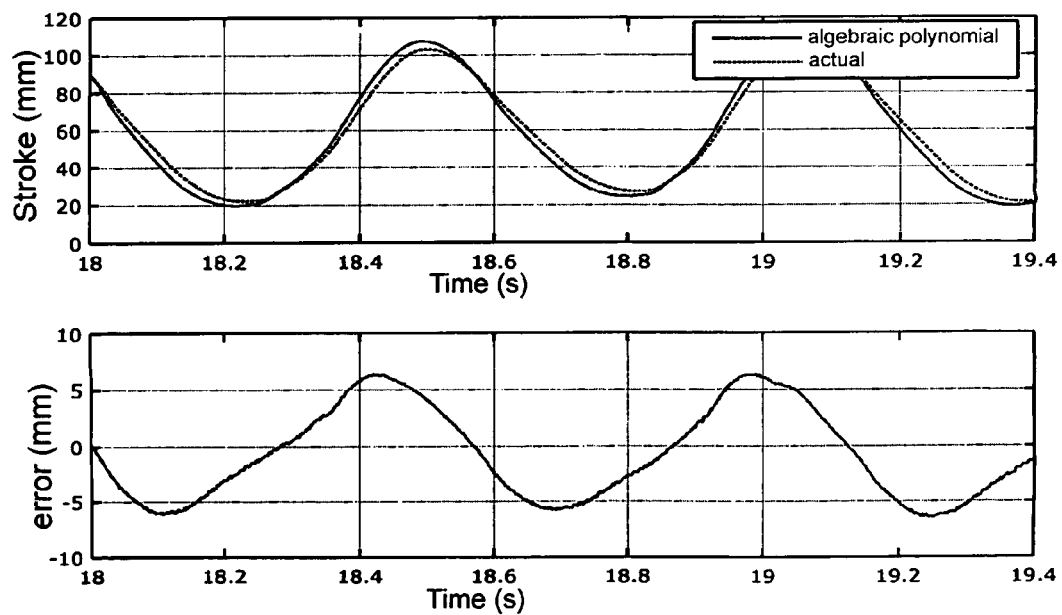
Figure 6:
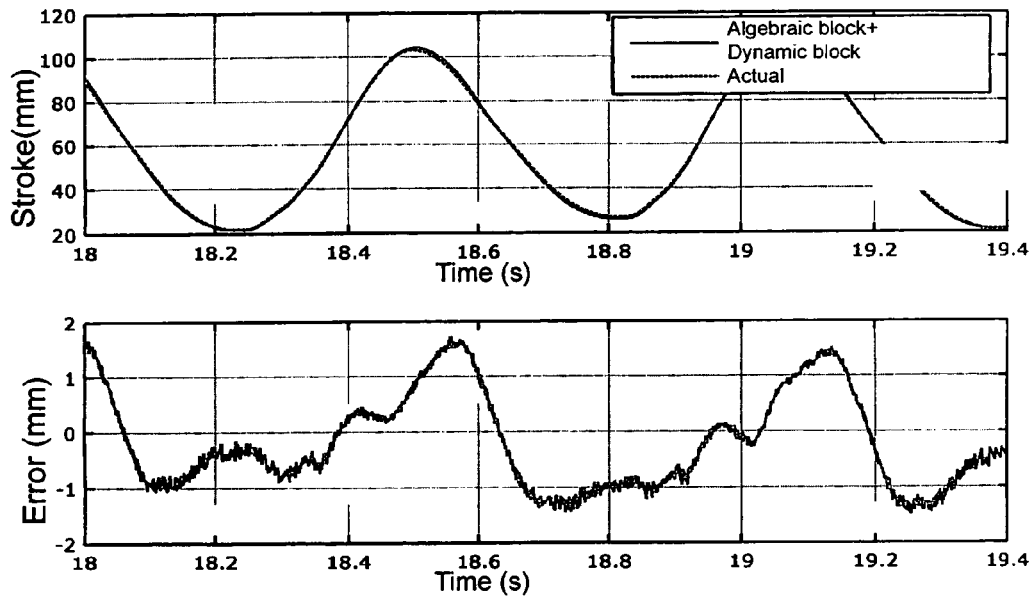
Figure 7:
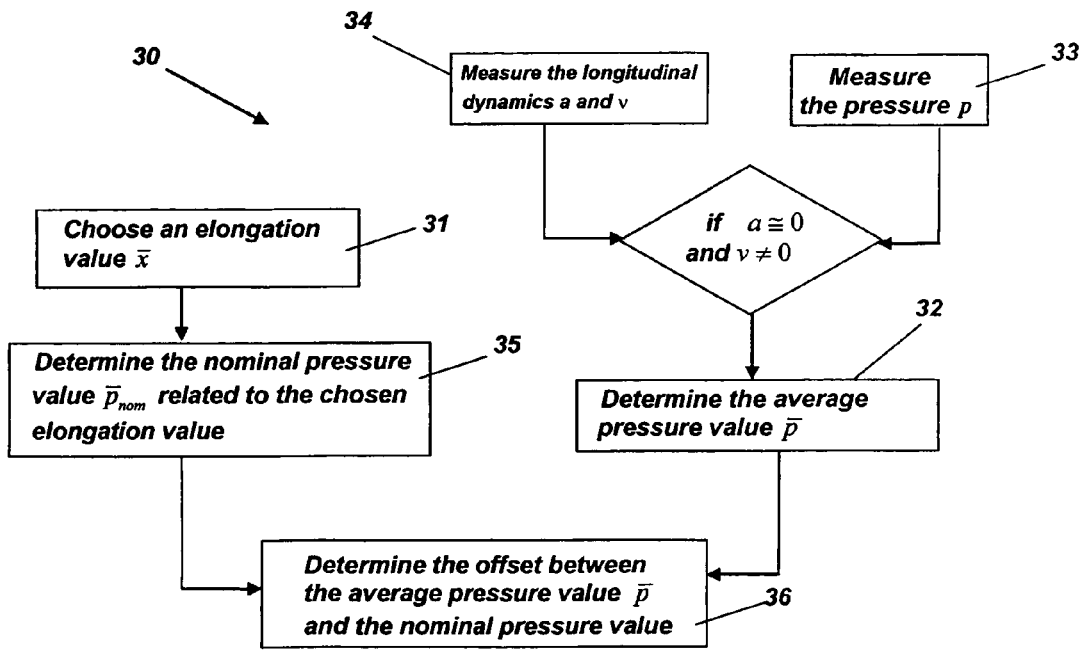
Figure 8:
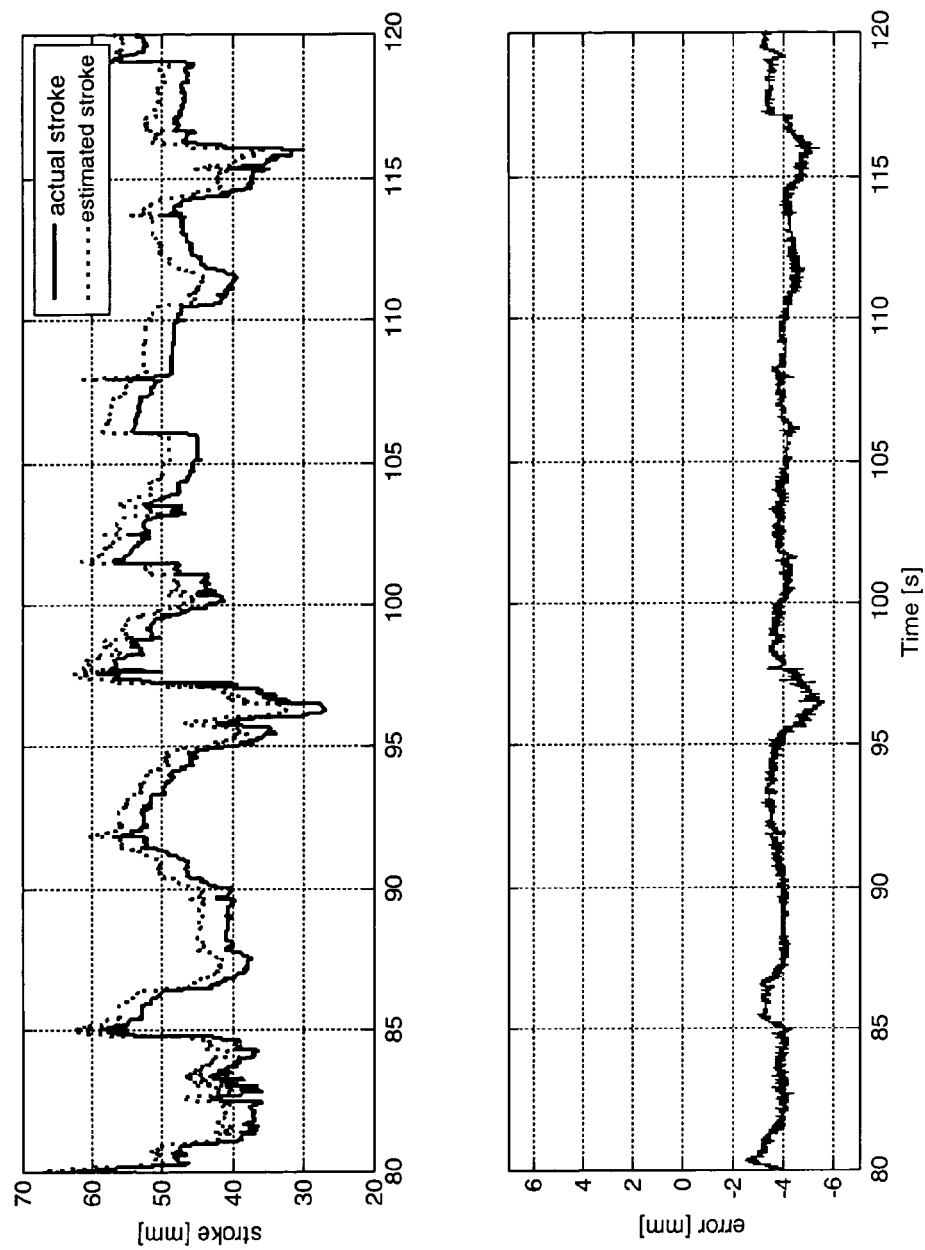
Figure 9:
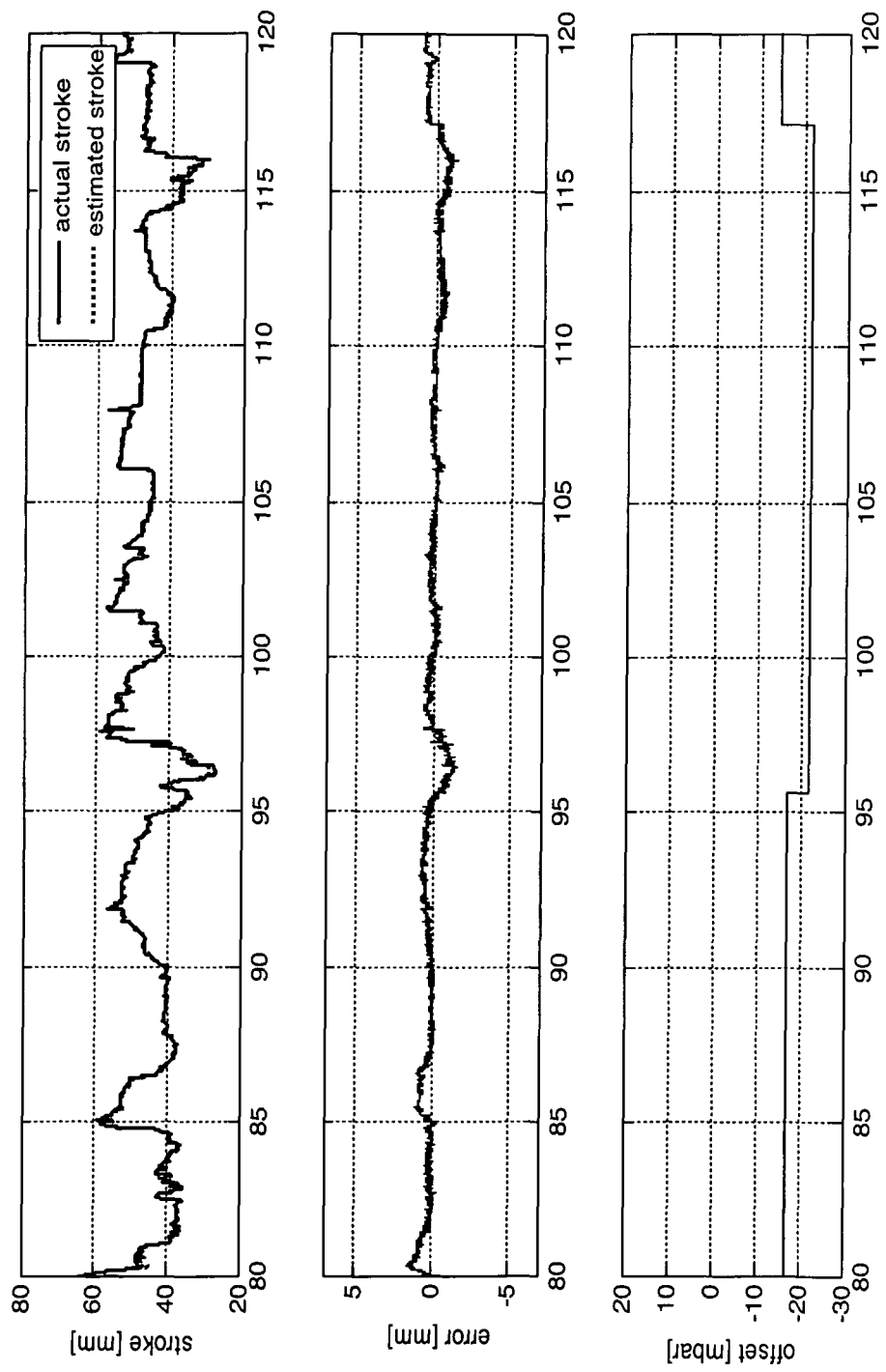

FIG. 4 graphically illustrates the variability law determined with respect to the experimental data;

FIG. 5 graphically shows the comparison between the actual and estimated stroke in the absence of the dynamic block;

FIG. 6 graphically shows the comparison between actual and estimated stroke in the presence of the dynamic block;

FIG. 7 is a block diagram of the calibration of the nominal conditions;

FIG. 8 graphically shows the comparison between actual and estimated stroke in the absence of the recalibration step;

FIG. 9 graphically shows the comparison between actual and estimated stroke in the presence of the recalibration step.

With reference to the figures, the estimation method of the suspension stroke of a vehicle is illustrated, in an entirely exemplifying manner, through an application of the same to the suspension of the front wheel of a motorcycle.

The applicant has identified that, by exploiting the connection that exists between the pressure present inside a shock absorber of a suspension and the stroke of the same, it is possible to estimate the compression level of the suspension based on a suitable processing of the detected/obtained pressure data.

To such end, a pressure sensor can be employed that is much stronger and less costly than the potentiometer used up to now in the direct measurement of the stroke. The applicant has therefore identified a model 10 that associates the pressure inside a shock absorber of a suspension and the stroke of the same.

In order to eliminate the systematic error deriving from an adiabatic modelling of the fluid present in the shock absorber, the applicant began from a black box model. Such approach permits, by knowing the inlet (pressure) and outlet (elongation) ahead of time, obtaining a relation between them, ignoring the physical laws that govern them.

The validity of a model thus obtained is strongly dependent on the type of excitation to which the system to be identified is subjected; therefore, the applicant deemed it necessary to introduce a repeatable test, capable of covering the entire interval of values assumed by the variables of interest.

A test run on the road, from which it is not possible to obtain a repeatable test signal of sufficient size, was therefore discarded.

In particular, the repeatable test was carried out in an exemplifying manner by binding the front wheel of the motorcycle to one wall and applying a periodic force on the two half-handlebars such to fully compress the fork of the same.

Figure 1:
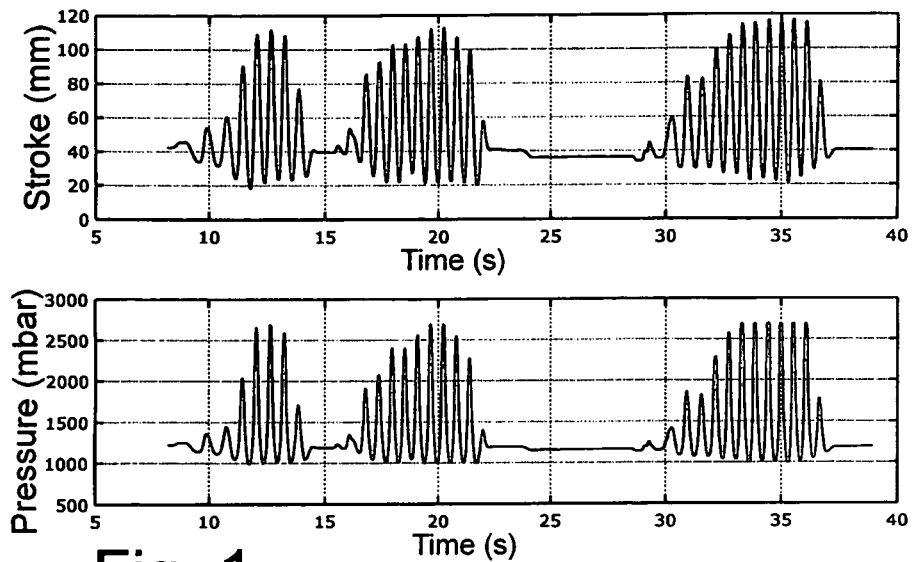

In FIG. 1, the progression is shown of the elongation and the pressure thus obtained.

Figure 2:
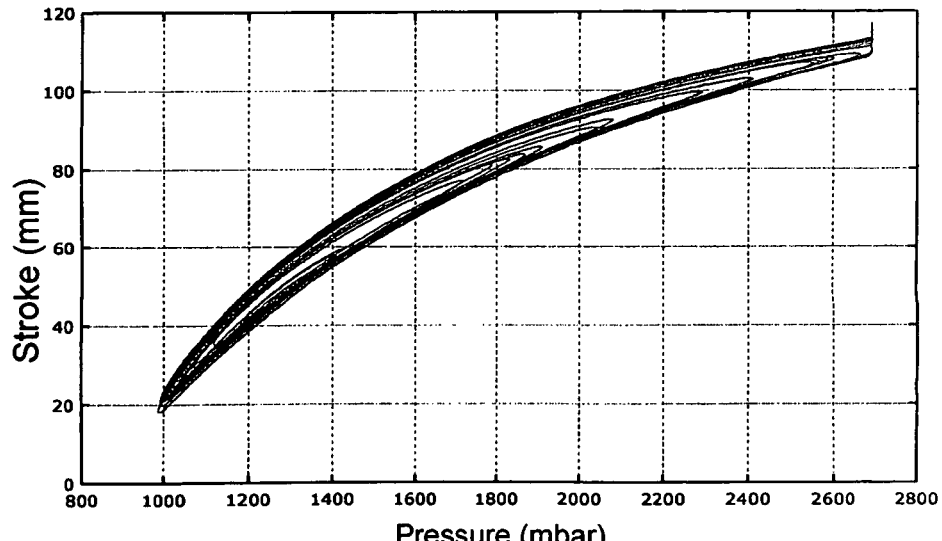
FIG. 2 is a graph that associates the variation of the stroke with the variation of the pressure.

Since the link between measured pressure and corresponding elongation is sought after, the applicant has chosen to represent the two quantities as a function of each other, starting from the acquired data (as shown in FIG. 2).

From such representation, the applicant has shown the presence of a hysteretic behaviour between compression and extension phase.

Figure 3:
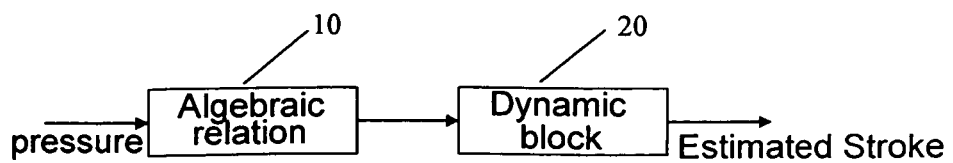
FIG. 3 is a block diagram of the modelling of the relation between the stroke and the pressure.

The applicant therefore deemed it preferable to also identify a dynamic filter 20 that modelled the hysteretic contribution and place the two models 10, 20 in tandem, as illustrated in FIG. 3.

With regard to the identification of a model 10 that associates the pressure inside a shock absorber of a suspension and the stroke of the same, the applicant employed an appropriate order polynomial, preferably a third-order polynomial, whose coefficients were determined by means of the least squares method applied to the available experimental data n.

Otherwise, the relation can be constructed starting from the available experimental data n through any other method for identifying the parameters of a variability law, such as for example interpolation, training neural networks or wavelets, and so on.

The modelling of the relation between the pressure inside a shock absorber of a suspension and the stroke of the same through a third-order algebraic polynomial produces the results shown in FIGS. 4 and 5, from which an estimation error is deduced due to the hysteresis present in the actual system.

Such estimation error was reduced by means of the dynamic block 20 modelling the hysteretic behaviour.

To such end, the applicant has identified a suitable causal digital system, for example a first-order, time-invariant linear system characterised by unity gain, pole and zero according to the following transfer function:

$$H(s) = \frac{1 + s\tau_g}{1 + s\tau_p}$$

The related parameters were identified through an identification method, such as the least squares method.

The cascade of the blocks introduced allowed obtaining optimal results, ensuring a net reduction of the estimation error, as illustrated in FIG. 6.

The connection between the pressure of the shock absorber chamber and the temperature of the surrounding environment introduces a possible variability of the estimate as a function of the work conditions; such variability is eliminated by means of a dynamic recalibration of the estimate as a function of the vehicle speed and the braking state.

In addition to the pressure sensor, therefore, a sensor is also required for the longitudinal vehicle dynamics.

By longitudinal vehicle dynamics it is intended the speed and the braking state of the vehicle.

The recalibration 30 starts from the definition of at least one point in the plane ($x_{stroke}$, p): in particular, the coordinates ($\bar{x}_{stroke}, \bar{p}$) can be obtained from a mean operation carried out over pressure and elongation at the same neutral position conditions. By neutral position it is intended a nearly complete absence of acceleration, whether positive or negative (braking) and low or zero speed.

Of the two quantities, $\bar{x}_{stroke}$ is arbitrarily fixed 31 while the other, $\bar{p}$, is calculated 32 in real time in the control unit starting from the measurement of available pressure p 33.

After the obtaining of such point it is then possible to set the superposition of the characteristic curves by means of the process described below that, repeated at pre-established intervals, ensures a continuous recalibration of the estimation procedure.

Starting from the arbitrarily fixed stroke value $\bar{x}_{stroke}$, the corresponding nominal pressure value 35 is obtained $\bar{p}_{nom}$, inverting the characteristic identified during the modelling step of the relation between the pressure inside a shock absorber of a suspension and the stroke:

$$\bar{x}_{stroke} = \alpha_3 \bar{p}_{nom}^3 + \alpha_2 \bar{p}_{nom}^2 + \alpha_1 \bar{p}_{nom} + \alpha_0$$

Subsequently, the calculation 32 takes place in the control unit of the average pressure value $\bar{p}$ corresponding to the reference elongation value $\bar{x}_{stroke}$ at neutral position.

36 is then obtained, in the chosen point—the offset—distance between the two curves:

$$\text{offset} = \bar{p} - \bar{p}_{nom}$$

Then, the calculated offset is subtracted from the instantaneous pressure values p so to return to the nominal condition through the following relation:

$$x_{stroke} = \alpha_3 \cdot (p - \text{offset})^3 + \alpha_2 \cdot (p - \text{offset})^2 + \alpha_1 \cdot (p - \text{offset}) + \alpha_0$$

In practice, the curve translates along the pressure axis by a value equal to the calculated offset.

In such a manner, it is possible to proceed with the correct estimation of the stroke.

Preferably, in order to obtain best results and to avoid sudden jumps in the error estimation, the offset value can be correlated to the preceding values through a causal digital filtering, for example low-pass filtering.

The estimation algorithm was implemented in the control unit and tested in test runs, in order to validate its effective functioning also in real conditions.

FIG. 8 shows the estimate carried out by using the determined characteristic referred to the nominal conditions and the consequent committed systematic error.

The systematic error is generally due to a heating of the sleeves of the fork close to the thermal group.

As illustrated in FIG. 9, the recalibration system is capable of dynamically compensating for such variation, ensuring a significant reduction of the committed error.

The same FIG. 9 also illustrates the dynamic nature of the recalibration process, presenting the time-progression of the estimated offset which, by being modified at every pre-established interval, ensures the correct superposition of the actual and nominal characteristics for every interval.

The presented results confirm the accuracy of the estimate, capable of providing a negligible estimate error with respect to the total available stroke.

Analogously, the same estimate method is also applicable to the estimate of the stroke of any other suspension type.

From the above description, the characteristics of the device, object of the present invention, are clear, as are the related advantages.

The estimation method of the suspension stroke according to the invention substantially comprises a first step of determining an appropriate variability law 10 which associates the stroke of the suspension with the pressure inside the shock absorber of the same, based on the experimental data; a second step of estimating the stroke value relating to a measured pressure value based on the identified variability law; and a repetitive reading step of the longitudinal vehicle dynamics, through which a recalibration 30 is determined of the variability law for the stroke estimation, taking into account the operating conditions of the vehicle.

Preferably, the estimation method of the suspension stroke according to the invention also comprises a correction step of the estimation error of the second step, through a dynamic filter 20.

For the implementation of the estimation method of the suspension stroke according to the invention, an apparatus is therefore sufficient which comprises processing means, such as for example the control unit itself of the vehicle, connected to a pressure sensor to be mounted on the shock absorber, as well as to a sensor of the longitudinal vehicle dynamics so to determine if the vehicle is in acceleration or braking phase.

A possible solution for making a sensor of the longitudinal vehicle dynamics is, for example, the use of a wheel encoder, generally already present on the motorcycle for reading the speed. Other solutions are in any case equally valid.

As a mere example, the block diagram of FIG. 7 refers to the use of an encoder for the vehicle speed and thus acceleration, and a brake threshold sensor for the braking state.

Moreover, as already set forth above, the method according to the present invention can be implemented through electronic equipment already normally present on the vehicle, such as the vehicle control unit.

Finally, it is clear that the method thus conceived is susceptible to numerous modifications and variants, all part of the invention; moreover, all details can be substituted with technically equivalent elements.

The invention claimed is:

1. Method for estimating the suspension stroke of a vehicle comprising the steps consisting of:
   a) determining at pre-established intervals the relation of a stroke of the suspension of a vehicle to changes in pressure inside a shock absorber of said vehicle using a pressure sensor in said shock absorber that measures pressure inside the shock absorber of said vehicle in order to determine the relation of the suspension stroke of the vehicle to changes in pressure in the shock absorber;
   b) estimating a suspension stroke value based on the relation of the stroke of the suspension of the vehicle to the changes in pressure inside the shock absorber as determined in step (a) by measuring changes in pressure in the shock absorber;
   c) detecting or obtaining the longitudinal vehicle dynamics by determining if the vehicle is accelerating or braking; and
   d) recalibrating (30) the suspension stroke value that was estimated in step b), based on the longitudinal vehicle dynamics detected/obtained in step c).

2. Method for estimating the suspension stroke according to claim 1, moreover comprising the step that consists of correcting any estimation error of step b) through a dynamic filter (20).

3. Method for estimating the suspension stroke according to claim 2, wherein said correction step of a possible estimation error of step b) consists of filtering the estimation results of said step b) by means of block (20) modelling a hysteretic behaviour.

4. Method for estimating the suspension stroke according to claim 2, wherein said dynamic filter (20) is a causal digital system.

5. Method for, estimating the suspension stroke according to claim 2, wherein the parameters of said dynamic filter (20) are determined by means of an identification method.

6. Method for estimating the suspension stroke according to claim 1, wherein said offset value is correlated with the preceding offset values through a causal digital filtering.

7. Apparatus for estimating the suspension stroke of a vehicle according to claim 1 comprising processing means and characterised in that said processing means are connected to the pressure sensor and to a sensor for the longitudinal dynamics.

8. Apparatus according to claim 7, wherein said processing means are a control unit of said vehicle.

* * * * *